March 29, 1955 J. W. SCHELL 2,704,992
GAS PLATING APPARATUS
Filed Dec. 28, 1951

INVENTOR.
John W Schell
BY Ralph Hammar
Attorney 2,704,992
Patented Mar. 29, 1955

2,704,992

GAS PLATING APPARATUS

John W. Schell, Erie, Pa., assignor to Erie Resistor Corporation, Erie, Pa., a corporation of Pennsylvania Application December 28, 1951, Serial No. 263,900
1 Claim. (Cl. 118—49)

Figures 1, 2:
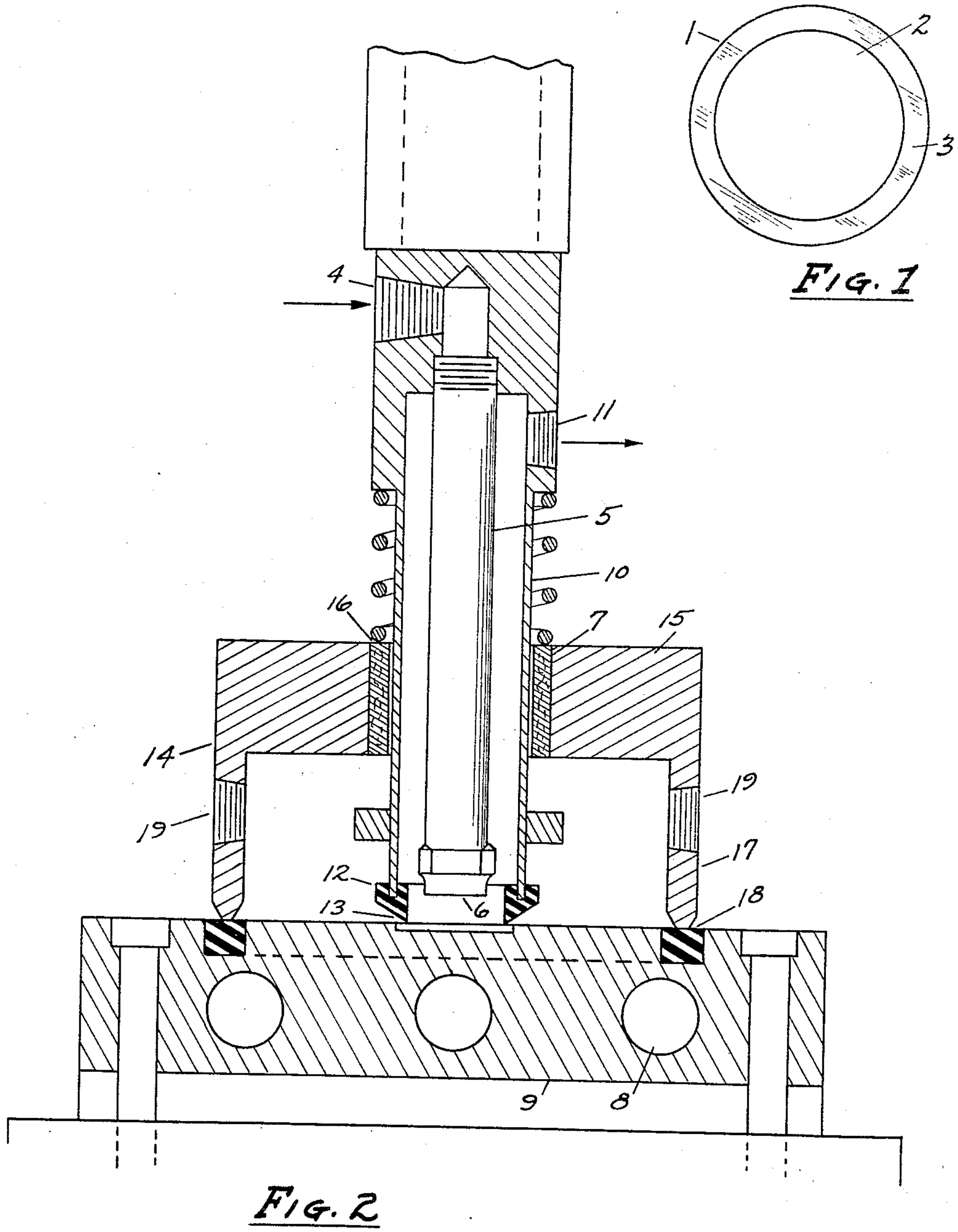

In the process known as gas plating, a metal compound is carried in vapor phase against a heated surface where the compound breaks down by pyrolysis and deposits a metal coating. This invention is intended to mask surfaces to be gas-plated so only the wanted portions will be metal coated. The masking is particularly adapted to capacitor dielectrics which require an uncoated band around the edge of the plated electrodes.

In the drawing, Fig. 1 is a plan of a capacitor dielectric disk, and Fig. 2 is a section through the plating and masking apparatus.

Fig. 1 shows a capacitor dielectric (e. g. ceramic, mica) disk or plate 1 having metal coatings or electrodes 2 on opposite faces. Around the electrodes is an uncoated or insulating band 3. The electrodes must be of low resistance to minimize losses and the edges of the electrodes should terminate sharply at the insulating band without fringing. These are well-understood requirements of the capacitor art.

To selectively coat a capacitor dielectric by gas plating, the vapor carrying gas is led in through an opening 4 in to a central tube 5 having its lower end 6 centered on and adjacent the area of the dielectric disk 1 to be coated. The details of the carburetor feeding the vaporized metal compound are not shown, since such carburetors are well known in the gas plating art and will vary with the metal compound to be vaporized.

The metal compound vapor may be mixed with an inert gas. The temperature of the tube 5 and of the carbureted vapor is below the decomposition temperature of the metal compound so no coating is obtained on the inside of the tube. The dielectric disk is heated above the decomposition temperature by resistance heating elements 8 embedded in a platen 9. The gas discharged from the lower end 6 of the tube strikes the heated surface of the ceramic disk and decomposes by pyrolysis into a metal coating, which adheres to the ceramic, and into other radicals which are carried off through concentric outer tube 10 to an outlet 11. The outer tube 10 carries a heat-resistance silicone rubber gasket 12 which has a rim 13 of the same inside diameter as the outer diameter of the electrode 2. The rim 13 engages the disk 1 and keeps the gas from contacting the portion of the disk which is to be uncoated. The gasket 12 from one aspect masks the outer rim of the disk. The temperature of the outer tube 10 can be kept below the decomposition temperature so the plating can be confined to the exposed hot surface of the dielectric disk against which the gas stream impinges. The tube 10 and gasket 12 and the disk 1 to be plated define the plating chamber, but since only the disk 1 is heated to plating temperature, the actual plating is confined to the exposed surface of the disk within the gasket.

To control the plating, it is desirable that the pressure in the plating chamber be variable. This is accomplished by a bell housing 14 having its top wall 15 sealed at 16 to the tube 7 and having a depending rim 17 in sealing engagement with a silicone gasket 18 in the top of the platen. Inlet and outlet openings 19 are provided through which a gas atmosphere of desired vacuum or pressure may be maintained. This prevents harmful leakage through the gasket 12 which could upset the plating.

For electrical condensers where the common dielectrics are mica or ceramic, the gas plating may be carried out with copper acetyl acetonate vaporized or carbureted into an inert gas such as $CO_2$, nitrogen, argon, the carbureted gas mixture being at a temperature of the order of 400° F. and the dielectric surface temperature being around 800° F. The carbureted gas temperature is below the decomposition temperature of the copper acetyl acetonate and the dielectric surface temperature is well above such temperature. Satisfactory copper coatings have been obtained at plating chamber pressures in the range from 10 m. m. up to above atmospheric pressure, the vacuum range being preferable for the elimination of oxygen adsorbed on the dielectric surface. Unless the oxygen is removed and kept from the surface of the dielectric, the plated coating will have co-deposited oxides. The combination of heating, vacuum, and purging with inert gas will remove the adsorbed oxygen. Gas plating of dielectrics is being claimed in co-pending application Serial No. 450,334 filed August 17, 1954.

Directing the gas stream against the area of the dielectric to be coated results in a uniform copper coating with or without co-deposited oxides, depending upon the care used in removing adsorbed oxygen. The coating has good adherence, because the gas makes intimate contact with the dielectric surface.

For production reasons, it may be desirable to have a number of disk-carrying platens 9 serviced by each gas plating head so that operations preliminary and subsequent to the plating operation will not tie up the plating head. This is a matter of apparatus economy and does not in any way affect the plating and masking operation so far described.

What is claimed as new is:

In an apparatus for gas plating dielectric disks and the like, a heated platen for supporting a disk, an inlet passageway for directing a stream of metal compound carrying gas toward the platen so as to impinge against the disk carried thereon, an outlet passageway leading the gas back away from the disk, said passageways comprising inner and outer tubes, a gasket on the outer tube for making sealing contact with the disk and defining the area thereon to be coated, the inner of the tubes being spaced from the disk, a bell housing sealed at its center to the outer tube and having side walls surrounding the outer tube and the gasket and sealed to the platen to provide with the outer tube a closed annular chamber outside the gasket, and means for maintaining a controlled gas atmosphere in said annular chamber to prevent harmful leakage through the gasket into the outer tube.

References Cited in the file of this patent

UNITED STATES PATENTS

| | | |
|---|---|---|
| 1,965,059 | Seibt | July 3, 1934 |
| 2,426,377 | Smith | Aug. 26, 1947 |
| 2,540,623 | Law | Feb. 6, 1951 |
| 2,587,036 | Germer et al. | Feb. 26, 1952 |
| 2,671,739 | Lander | Mar. 9, 1954 |

FOREIGN PATENTS

| | | |
|---|---|---|
| 589,977 | Great Britain | July 4, 1947 |